(12) United States Patent
Cornille

(10) Patent No.: US 9,385,541 B2
(45) Date of Patent: Jul. 5, 2016

(54) UNIVERSAL FAST CHARGER FOR ANY RECHARGEABLE ELECTROLYTIC ELEMENT, ALKALINE BATTERIES AND ACCUMULATORS

(75) Inventor: Patrick Cornille, Saint Remy les Chevreuse (FR)

(73) Assignee: Advanced Electromagnetic Systems, Saint Remy les Chevreuse (FR)

( * ) Notice: Subject to any disclaimer, the term of this patent is extended or adjusted under 35 U.S.C. 154(b) by 597 days.

(21) Appl. No.: 12/531,924

(22) PCT Filed: Mar. 7, 2008

(86) PCT No.: PCT/FR2008/050395
§ 371 (c)(1),
(2), (4) Date: Mar. 5, 2010

(87) PCT Pub. No.: WO2008/125790
PCT Pub. Date: Oct. 23, 2008

(65) Prior Publication Data
US 2015/0069972 A1  Mar. 12, 2015

(30) Foreign Application Priority Data
Mar. 20, 2007 (FR) ...................................... 07 01977

(51) Int. Cl.
*H02J 7/00* (2006.01)

(52) U.S. Cl.
CPC ............... *H02J 7/0003* (2013.01); *H02J 7/007* (2013.01); *H02J 7/0016* (2013.01); *H02J 7/0021* (2013.01); *H02J 7/0026* (2013.01); *H02J 7/0052* (2013.01); *H02J 7/0093* (2013.01)

(58) Field of Classification Search
CPC ...... Y02E 60/12; H02J 7/0004; H02J 7/0006; H02J 7/0003; H01M 10/48; H01M 10/4257
USPC ........................................................ 320/110
See application file for complete search history.

(56) References Cited

U.S. PATENT DOCUMENTS

| 4,626,765 A | * | 12/1986 | Tanaka ........................... 320/127 |
| 4,670,703 A | * | 6/1987 | Williams ....................... 320/125 |
| 4,878,145 A | * | 10/1989 | Lace .............................. 361/118 |
| 5,013,992 A | * | 5/1991 | Eavenson et al. .............. 320/158 |
| 5,818,201 A | | 10/1998 | Stockstad et al. |
| 5,889,385 A | | 3/1999 | Podrazhansky et al. |
| 2002/0130634 A1 | * | 9/2002 | Ziemkowski et al. ......... 320/106 |
| 2004/0090209 A1 | * | 5/2004 | Nishida et al. ................. 320/149 |
| 2004/0251880 A1 | | 12/2004 | O'Brien |

FOREIGN PATENT DOCUMENTS

| FR | 2 789 818 | 8/2000 |
| WO | WO 92/06525 | 4/1992 |
| WO | WO 01/06613 | 1/2001 |
| WO | WO 2008/125790 | 10/2008 |

OTHER PUBLICATIONS

International Search Report and Written Opinion dated Oct. 2, 2008 for Application No. PCT/FR2008/050395.

* cited by examiner

*Primary Examiner* — Arun Williams
(74) *Attorney, Agent, or Firm* — Frost Brown Todd LLC

(57) ABSTRACT

The invention relates to a universal quick charger for recharging primary or secondary electrolytic members, in particular alkaline batteries with a non-rechargeable reputation, that can receive and automatically recharge a variable number of members without manual switching, that further comprises a switching transistor for hashing the recharge current in order to impart thereto a pumped characteristic, and that further comprises a microprocessor for automatically detecting the number and the nature of the members to be recharged, for supervising the recharging using a routine for continuously measuring the voltage at the terminals of the members as well as the time elapsed since the beginning of the recharging, said microprocessor being further used for deciding to stop the recharging when a criterion of the supervision routine is validated.

9 Claims, 2 Drawing Sheets

Figure 1:
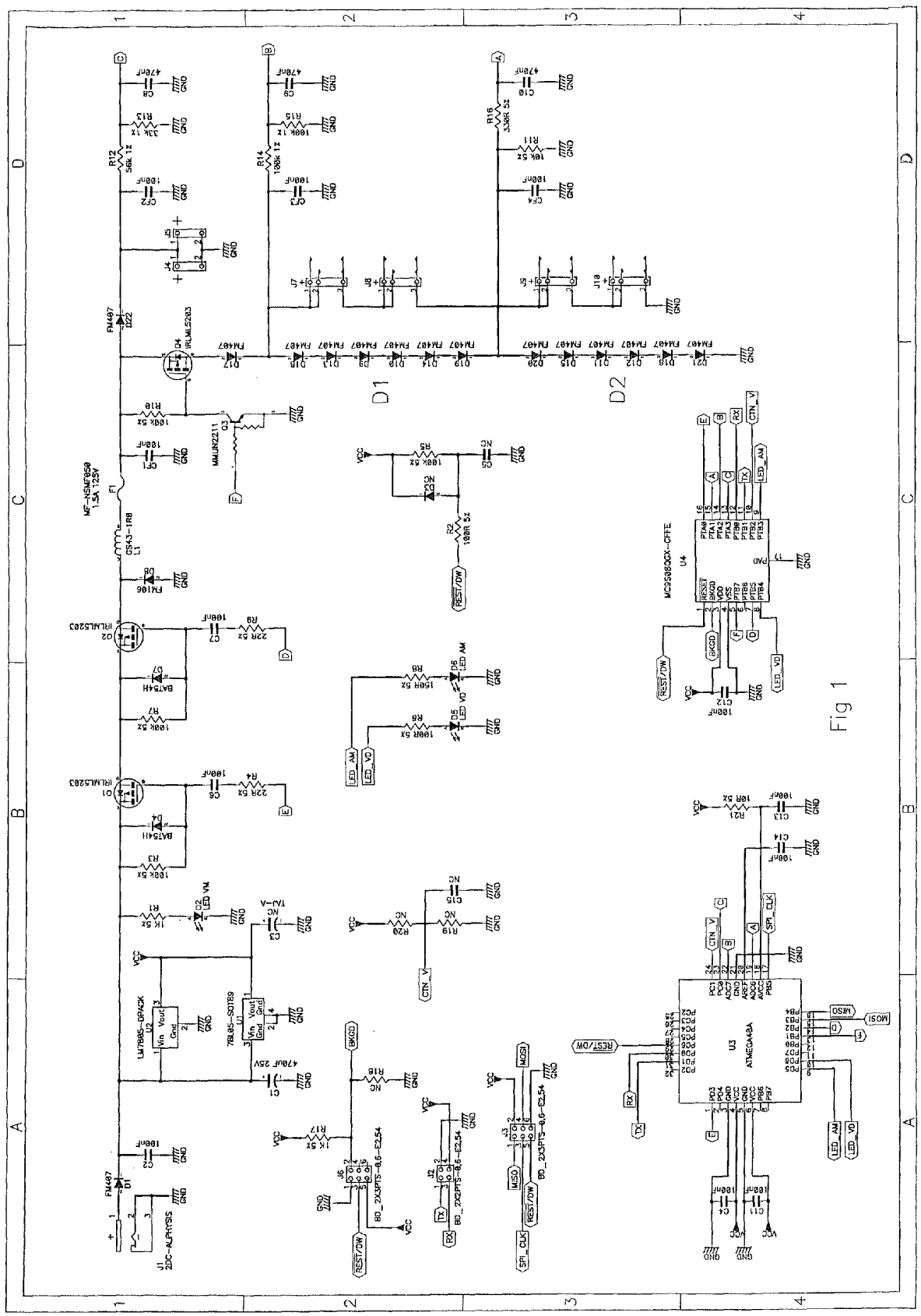

UNIVERSAL FAST CHARGER FOR ANY RECHARGEABLE ELECTROLYTIC ELEMENT, ALKALINE BATTERIES AND ACCUMULATORS

The invention object of this patent application consists of a fast charger making it possible to reload partially alkaline batteries as well as refillable accumulators of the cadmium-nickel type (NiCad) or nickel-metal-hydride (NiMH).

Patent FR2789818 of the applicants describes a fast charger intended to reload electrostatic or refillable accumulators, also being able to reload partially alkaline batteries, comprising an oscillator and a comparator making it possible to put an end to the refill when the maximum tension is reached. This device comprises many advantages compared to the existing chargers, in particular concerning the flexibility of employment to reload a variable number of batteries. However, regarding as decisive advantages the possibility indistinctly of reloading any type of battery or refillable accumulator, in a variable number while detecting the type of battery automatically and by supervising at the same time the various parameters like the terminal voltage of the batteries and the current of refill in the course of time so as to optimise the operational safety, the goal of this patent application is simultaneously to propose a charger joining together these advantages.

The solution making it possible to achieve this goal is composed of the characteristics of the independent claim and detailed in the two alternatives of execution described below. Other alternatives using the same characteristics basically but comprising some minor modifications can easily be deduced from this request by the expert, without calling in question the spirit of this invention. To place this invention in its context, it is advisable to recall here, as explained in patent FR2789818, what many experimental tests showed in a surprising way that alkaline batteries considered as non-refillable, can be reloaded partially in so far as two essential conditions are observed:

The refill must be done in a pulsated mode, i.e. the current of refill traversing the batteries must consist of pulses separated by intervals at null current, according to a cyclic ratio optimized by experimental ways. This form of current wave seems to facilitate the regeneration of the chemical species essential to the operation of the battery during its use in mode of discharge, and also has the advantage of causing a heating of the battery much weaker than that which one can observe at the time of attempts at refill in D.C. current whose disadvantages, in particular risk of leakage or even of bursting, are known.

It is imperative to define a reliable criterion to put an end to the charge, thus avoiding an overload which can present the risks quoted above, of leakage and even of bursting in the extreme cases. This criterion can be to supervise the terminal voltage of the batteries and to put an end to the refill by cancelling the current as soon as the tension reached a pre-adjusted maximum value or to stop the refill while being based over the total duration of current flow of the refill, or, this criterion can be obtained by the combination of the two preceding methods, tension and duration, by means of an intelligent logical system.

The essential advantage of the charger according to the invention is to be able to recharge ordinary alkaline batteries. There exists in the market chargers of said special alkaline batteries RAM (Refillable Alkaline Manganese), batteries of which the tight structure and the choice of the components make it possible to ensure a refill without risks. However, the cost of these batteries is a considerable disadvantage.

The invention will be now described in detail by calling upon the figures which illustrate the text. It should be noted that in the descriptive text below, the term "battery" is employed as example; in the claims, the generic term "element" is employed to cover as well the batteries as the refillable accumulators.

The FIG. 1 represents the diagram of a first preferential version of the charger according to the present invention.

Figure 2:
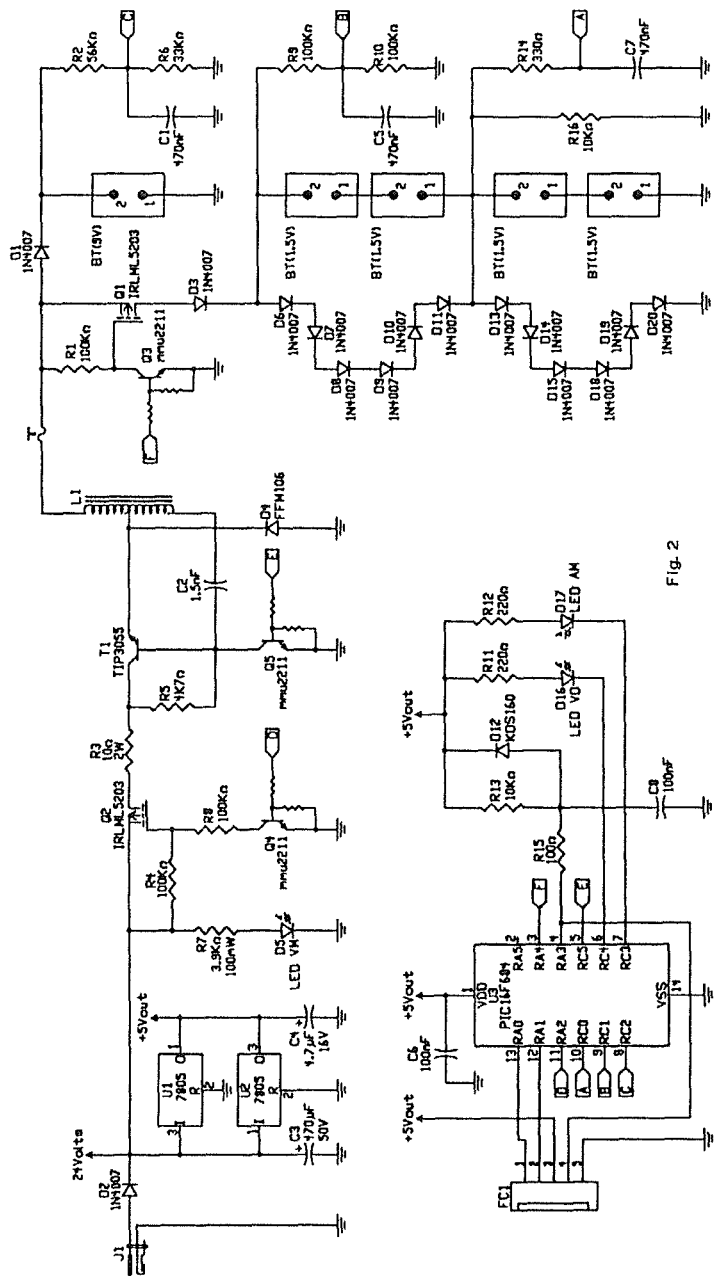

The FIG. 2 represents the diagram of a second version of the charger according to the present invention, version preserving the oscillator described in the patent FR2789818.

The first version comprises a connector J1 making it possible to supply the charger by means of an external module of power, this disposition having the advantage of reducing the weight of the charger. However, it is completely permissible to integrate the module of power in the charger, the connection to the grid can be also integrated on the wall of the charger case. The nominal voltage output of the module of power is advantageously 14 volts to allow the refill of batteries of 9V, but can of course be adapted to other values of nominal voltage of batteries and respective associations. A D1 diode makes it possible to avoid any possible risk of inversion of polarity by the accidental use of a module of power non-in conformity. It is also permissible to supply the charger starting from a car battery, for example.

A voltage regulator U1 or U2 lowers the voltage to the value of supply voltage required by the microprocessor U3 or U4. This one manages the whole functions of detection of the number and the type of batteries inserted in the charger, of controlling the Q2 transistor responsible for the wave shape of the refill current, of controlling the functions of protection, and supervision of the terminal voltage of the batteries and the duration of the current of refill, thus determining the end of the refill. A blocking transistor Q1 connected in series with the transistor of commutation Q2, makes it possible to protect the circuit by stopping the charging current during an abnormal operation of the circuit. A L1 inductance of low value, about the micro-henry, has as a function, in combination with the capacitor CF1, to attenuate the emission of electromagnetic disturbances; it does not have a function of smoothing the refill current.

The groups of diodes D-1 and D-2, of 6 diodes in series each one, make it possible to ensure the continuity of the circuit, constituting an alternate way, when all the batteries of 1.5 V (4 batteries to the maximum in the case of FIG. 1) are not installed, which makes it possible to only charge if it is wished, two batteries, for example J9 and J10, or J7 and J8, without the need for any switch or a manual intervention.

In a general manner, the circuit which can receive and charge automatically a variable number of elements makes it possible to establish a connection series of the elements, by associating two or several groups of elements of connection series, each group itself making up of two or several elements of connection in series, and being characterized moreover in what a network of silicon diodes series-connected. In particular, in the case of FIG. 1, six diodes are connected in parallel on each group of two elements.

Moreover, the circuit is able to charge a J4, J5 battery of 9 V, instead of batteries of 1.5 V; in this case, the battery of 9 V occupies partially the place of the batteries of 1.5 V, which ensures the wished exclusion, not planning to recharge these two types of batteries simultaneously. Non-return diodes D17 and D22 avoid any interaction between each type of battery installed and the components located in other parts of the circuit, also avoiding the discharge of a battery of 9 V left in the charger whereas the power module would have been disconnected. A F1 fuse, preferably from the type known as reusable, protects the circuit against an inversion of polarity of the battery of 9 V per erroneous installation (impossible inversion for the batteries of 1.5 V from their form), and also protects the circuit against employment from a power module of excessive tension. These protection dispositions are required by the safety requirements in force for the homologation of electrical appliance.

In a general manner, the circuit comprises a circuit in derivation on the whole of the elements connected in series, this circuit making it possible to recharge a battery consisted the coupling of several elements in series, in particular a battery of 9 V quoted above.

To make possible to adjust the current in all elements connected in series or to put out the diodes in parallel with these groups when those are not installed, whereas the battery is installed in the circuit in derivation, a transistor Q4 is placed in series with the whole of the groups of elements connected in series so as to optimize the current of refill in each active branch of the circuit.

In the particular case of the battery of 9 V quoted above, the transistor Q4 remains in a blocked state when a battery of 9 V is installed, thus making it possible to eliminate the influence of the groups of diodes D-1 and D-2; Q4 is conducting when one wishes to recharge batteries of 1.5 V. This commutation of Q4, automatically assured by the microprocessor during its routine detection of the type of batteries installed, makes it possible to obtain an optimum current in each case.

Voltage dividers equipped with filters (output C and B), as well as a filter (output A) condition in an appropriate way the respective voltages measured at the terminals of the batteries to make these voltages compatible with the inputs of the microprocessor. The transistor Q1 provides an additional function of protection by stopping the current at the time of a defect of the circuit, in adequacy with the European standards relating to the electronic circuits. The microprocessor permanently sweeps the three sites designed to install batteries to be charged, and detects which of them has indeed batteries installed.

When batteries (2 or 4 batteries) of 1.5 V are detected, the charge begins for a duration of 3 hours up to 3 hours 30 at a maximum, and the terminal voltage of the batteries is measured permanently. If the voltage exceeds 1.55 V time the number of batteries, the microprocessor considers that the batteries are alkaline, and will stop the load either when the voltage does not increase any more on an interval of 8 to 10 minutes (to insist in continuously recharging would present the risks mentioned above of heating, leakage or explosion), or when the duration of maximum refill is reached.

If the voltage does not exceed 1.55 V time the number of batteries in 3 hours of time, the microprocessor considers that the batteries are in fact refillable accumulators of the Nickel-Cadmium type (NiCad) or Nickel-Metal-hydride (NiMH), and will stop the charge either during the detection of a reduction in the voltage (characteristic of an accumulator charged), or when a 12 hours total duration is reached.

In the case of batteries of 9 V, it is not easy to discriminate if they are batteries or refillable accumulators, the latter existing into 6 or 7 cells of 1.2 V connected in series. However, as the accumulators in general have a capacity of about 200 mAh and recharge themselves suitably in 1 h 30 with the circuit of the invention, and as the alkaline batteries of 9 V are also recharged over this duration, one can adopt as a criterion to stop the charge, either the stabilization of the tension on an interval of 8 to 10 minutes, or the duration of the refill of 1 h 30 really accomplished.

It should be noted that the parameters adopted for the circuit constitute values of compromise making it possible to recharge as well batteries of format AA or AAA (the charger being prepared mechanically to receive the 2 formats), and that moreover the criteria adopted to stop the charge were satisfactory and sure for all the brands of batteries tested.

The second version, illustrated by FIG. 2, differs only by the presence of the autonomous oscillator or astable, realized using a transistor T1, the auto-transformer L1, the capacitor C2, the resistance RS and the diode of release, this oscillator coming to substitute the transistor Q2 of the scheme of the previous version. In this second version, the oscillator typically presents a relatively reduced range of values acceptable for the cyclic ratio, which requires a supply voltage higher (24 V) than that of the first version. The detailed operation of the oscillator was described in the patent FR2789818.

Claims

1. Universal fast charger to recharge primary electrolytic elements as well as secondary, particularly of the alkaline batteries said to be non-refillable, characterized in that it comprises a circuit which can receive and recharge automatically a variable number of elements without manual commutation, comprising moreover a transistor of commutation allowing to chop the current of refill so as to give a pulsated character to him, comprising moreover a microprocessor having for function the automatic control of the number of elements to be recharged as well as their kind, the supervision of the refill by means of a routine allowing continuously to measure the terminal voltage of the elements, as well as the time passed since the beginning of the refill, the microprocessor having moreover for function to take decision to stop the refill when a criterion of the routine of supervision is checked.

2. Charger according to claim 1, characterized in that the circuit which can receive and recharge automatically a variable number of elements makes it possible to establish a series connection of the elements, by associating two or several groups of elements of connection in series, each group itself making up of two or several elements of connection in series, and characterized moreover in what a network of silicon diodes series-connected, in particular six diodes by group of two elements, are connected in parallel on each group.

3. Charger according to one of the claims 1 or 2, characterized in that the transistor of commutation is controlled by the microprocessor.

4. Charger according to one of the claims 1 or 2, characterized in that the transistor of commutation is controlled in an independent way by a circuit made of an autonomous oscillator or astable including the aforementioned transistor, and characterized moreover by the fact that the oscillator automatically modifies his cyclic ratio according to the terminal voltage of the electrolytic elements to recharge, so as to maintain the current of charge roughly constant.

5. Charger according to one of the preceding claims, characterized in that the criterion of the routine of supervision used to stop the refill is based on the observation of the variation of terminal voltage of the elements on an interval of given time.

6. Charger according to one of claims 1 to 4, characterized in that the criterion of the routine of supervision used to stop the refill is based over the total duration of current flow of refill.

7. Charger according to one of claims 1 to 4, characterized in that the criterion of the routine of supervision used to stop the refill is based on a logical combination of the criteria of claims 5 and 6.

8. Charger according to one of the preceding claims, characterized in that it comprises a transistor of blocking connected in series with the transistor of commutation, this transistor of blocking allowing to protect the circuit by stopping the charging current during an abnormal operation of the circuit.

9. Charger according to one of claim 2 with 8, characterized in it that it includes a circuit in derivation on the whole elements connected in series, circuit allowing to recharge a battery constituted by the integration of several elements in series, in particular a battery of nominal voltage 9 volt, and characterized moreover by the fact that a transistor is placed in series with the whole group of elements connected in series, this transistor allows to adjust the current in these elements or to put out the diodes in parallel with these groups when those are not installed, whereas the battery is installed in the circuit in derivation, so as to optimize the current of refill in each activated branch of the circuit.

10. Process of bringing into play of a universal charger to recharge primary and secondary electrolytic elements according to one of the preceding claims, characterized by the use of a routine programmed and memorized in the microprocessor, comprising the following stages:

The microprocessor permanently sweeps the three sites designed to install batteries to be recharged, and detects which of them has indeed batteries installed When batteries, in particular 1 or 2 groups of 2 batteries of 1.5 V are detected, the charge begins for a 2 to 3 hour 30 duration, and the terminal voltage of the batteries is measured permanently; if the voltage exceeds 1.55 V time the number of batteries, the microprocessor considers that the batteries are alkaline, and will stop the charge either when the voltage does not increase any more on an interval of 8 to 10 minutes, or when the maximum duration of refill set in the microprocessor is reached;

If the voltage does not exceed 1.55 V time the number of batteries in 3 hours of time, the microprocessor considers that the cells are in fact of the refillable accumulators of the type NiCad or NiMH, and will stop the charge either during the detection of a reduction in the voltage, characteristic fact of a charged accumulator, or when a 12 hours total duration is reached.

In the case of battery of 9 V, considering as it is not easy to discriminate if they are batteries or refillable accumulators, the latter existing into 6 or 7 elements of 1.2 V connected in series, the procedure consists in applying the charging current and adopting as a criterion to stop the refill, the phenomenon appearing initially among the two following, either the stabilization of the voltage on an interval of 8 to 10 minutes, or the maximum duration of the refill (about 1 h 30) set in the microprocessor effectively accomplished, this duration has been determined in experiments as sufficient as well for a battery as for a refillable accumulator of 9 V.

SUMMARY

Universal fast charger to recharge primary electrolytic elements as well as secondary, particularly of the alkaline batteries said to be non-refillable, being able to receive and recharge automatically a variable number of elements without manual commutation, comprising moreover a transistor of commutation allowing to chop the current of refill so as to give a pulsated character to this current, comprising moreover a microprocessor having for function the automatic control of the number of elements to recharge as well as their kind, the supervision of the refill by means of a routine allowing to measure continuously the terminal voltage of the elements, as well as the time passed since the beginning of the refill, the microprocessor having moreover for function to make the decision to stop the refill when a criterion routine of supervision is checked.

The invention claimed is:

1. Universal fast charger to recharge primary electrolytic elements as well as secondary, particularly of the alkaline batteries said to be non-refillable, characterized in that said charger comprises a circuit which can receive and recharge automatically a variable number of elements without manual commutation, and additionally comprising a transistor of commutation which chops the refill current so as to give a pulsated character to it, comprising moreover a microprocessor having as its function the automatic control of the number of elements to be recharged as well as their kind, the supervision of the refill by means of a routine allowing continuously to measure the terminal voltage of the elements, as well as the time passed since the beginning of the refill, the microprocessor having moreover the function of deciding to stop the refill when a criterion of the routine of supervision is checked, wherein said charger is characterized in that the circuit which can receive and recharge automatically a variable number of elements makes it possible to establish a series connection of the elements, by associating two more groups of elements of connection in series, each group itself making up of two or more elements of connection in series, and characterized moreover in that a network of six silicon diodes in groups of two elements, are connected in parallel on each group.

2. Charger according to claim 1, characterized in that the transistor of commutation is controlled by the microprocessor.

3. Charger according to claim 1, characterized in that the transistor of commutation is controlled in an independent way by a circuit made of an autonomous oscillator or astable including the aforementioned transistor, and characterized moreover by the fact that the oscillator automatically modifies its cyclic ratio according to the terminal voltage of the electrolytic elements to recharge, so as to maintain the current of charge roughly constant.

4. Charger according to claim 1, characterized in that the criterion of the routine of supervision used to stop the refill is based on the observation of the variation of terminal voltage of the elements on an interval of given time.

5. Charger according to claim 1, characterized in that the criterion of the routine of supervision used to stop the refill is based over the total duration of current flow of the refill.

6. Charger according to claim 1, characterized in that the criterion of the routine of supervision used to stop the refill is based on a logical combination of the variation of terminal voltage of the elements in a given interval of time and the total duration of current flow of the refill.

7. Charger according to claim 1, characterized in that it comprises a transistor of blocking connected in series with the transistor of commutation, this the transistor of blocking protecting the circuit by stopping the charging current during an abnormal operation of the circuit.

8. Charger according to claim 1, characterized in it that it includes circuit allowing to recharge a battery constituted by the integration of several elements in series, in particular a 9 volt battery, and characterized moreover by the fact that a transistor is placed in series with the whole group of elements connected in series, this transistor allowing adjustment of the current in these elements or to put out the diodes in parallel with these groups when those are not installed, whereas the battery is installed in the circuit in derivation, so as to optimize the current of refill in each activated branch of the circuit.

9. Process of using a universal charger to recharge primary and secondary electrolytic elements, characterized by the use of a routine programmed in the microprocessor, comprising the following stages:

the microprocessor permanently sweeps the three sites designed to install batteries to be recharged, and detects which of them requires batteries to be installed;

when batteries, in particular 1 or 2 groups of 2 1.5 V batteries are detected, the charge begins for a 2 to 3 hour duration, and the terminal voltage of the batteries is measured permanently; if the voltage exceeds 1.55 V times the number of batteries, the microprocessor considers that the batteries are alkaline, and will stop the charge either when the voltage does not increase any more after an interval of 8 to 10 minutes, or when the maximum duration of refill set in the microprocessor is reached;

if the voltage does not exceed 1.55 V times the number of batteries in 3 hours of time, the microprocessor considers that the cells are in fact of the refillable accumulators of the type NiCad or NiMH, and will stop the charge either during the detection of a reduction in the voltage, characteristic fact of a charged accumulator, or when a 12 hours total duration is reached; and in the case of a 9 V battery, in order to discriminate if they are batteries or refillable accumulators, the latter existing into 6 or 7 elements of 1.2 V connected in series, the procedure consists of applying the charging current and adopting as a criterion to stop the refill, the phenomenon appearing initially among the two following, either the stabilization of the voltage on an interval of 8 to 10 minutes, or the maximum duration of the refill set in the microprocessor effectively accomplished.

* * * * *